United States Patent
Mizrahi

(10) Patent No.: US 7,991,968 B1
(45) Date of Patent: *Aug. 2, 2011

(54) QUEUE MEMORY MANAGEMENT

(75) Inventor: Noam Mizrahi, Modi'in (IL)

(73) Assignee: Marvell Israel (MISL) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/032,552

(22) Filed: Feb. 15, 2008

Related U.S. Application Data

(63) Continuation of application No. 10/873,354, filed on Jun. 22, 2004, now Pat. No. 7,334,091.

(60) Provisional application No. 60/534,482, filed on Jan. 5, 2004.

(51) Int. Cl.
*G06F 12/00* (2006.01)

(52) U.S. Cl. .......................... 711/154; 710/52

(58) Field of Classification Search ................. 711/154; 710/52

See application file for complete search history.

(56) References Cited

U.S. PATENT DOCUMENTS

| | | | |
|---|---|---|---|
| 4,682,284 A * | 7/1987 | Schrofer | 710/55 |
| 5,459,839 A | 10/1995 | Swarts et al. | |
| 6,088,740 A * | 7/2000 | Ghaffari et al. | 710/5 |
| 6,374,313 B1 * | 4/2002 | Popat | 710/52 |
| 6,996,820 B1 * | 2/2006 | Middleton et al. | 718/100 |
| 2003/0110325 A1 * | 6/2003 | Roach et al. | 710/22 |
| 2003/0141897 A1 | 7/2003 | Bentz | |
| 2003/0236946 A1 * | 12/2003 | Greubel | 711/118 |

OTHER PUBLICATIONS

American Heritage College Dictionary, Copyright © 2002, Houghtom Mifflin, Fourth Edition, p. 1279.*

* cited by examiner

*Primary Examiner* — Hashem Farrokh

(57) ABSTRACT

Systems and techniques relating to managing a queue memory include, in some implementations, a method comprising: retrieving stored data from an oldest read entry in a FIFO queue memory having entries formed in hardware upon a first read operation; retrieving stored data from a selected entry in the FIFO queue memory upon a second read operation; and shifting data stored in entries of the FIFO queue memory with respect to the oldest read entry upon the first read operation and with respect to the specified entry upon the second read operation. In addition, some implementations include a queue memory comprising a hardware device having memory entries to receive and store data from a communications interface, wherein the queue memory supports first-in-first-out read operations and out-of-order read operations with data shifting among the entries of the memory relative to a read operation.

14 Claims, 3 Drawing Sheets

QUEUE MEMORY MANAGEMENT

CROSS REFERENCE TO RELATED APPLICATIONS

This application is a continuation application of and claims priority to U.S. application Ser. No. 10/873,354 filed on Jun. 22, 2004, which claims the benefit of the priority of U.S. Provisional Application Ser. No. 60/534,482, filed Jan. 5, 2004 and entitled "A Breathing Queue".

TECHNICAL FIELD

The present disclosure describes systems and techniques relating to first in first out (FIFO) memory design, for example, a FIFO queue memory with data shifting and out-of-order read support.

BACKGROUND

A queue is a basic element in many logic designs. Queues are frequently implemented to have FIFO (first in first out) functionality, but queues can also have more complex input/output algorithms. In a conventional FIFO queue, the FIFO has a memory array of N×M bits, where N is the FIFO depth, and M is the FIFO width. The conventional FIFO queue also has read and write pointers.

New data is written to the FIFO entry identified by the write pointer, and data is read from the FIFO entry identified by the read pointer. With each write to the FIFO, the write pointer is incremented. With each read from the FIFO, the read pointer is incremented.

SUMMARY

The present disclosure includes systems and techniques relating to FIFO queue memory. According to an aspect of the described systems and techniques, a queue memory receives and stores information and supports first-in-first-out read and out-of-order read operations with information shifting within the memory relative to a read operation. The queue memory can include a write pointer that increments upon a write operation and decrements upon the read operation, a read pointer that identifies an oldest read entry of the queue memory when the read operation is a first-in-first-out read and that identifies a selected entry of the queue memory when the read operation is an out-of-order read, and a multiplexer operative to select entries of the queue memory responsive to the read pointer.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Figure 1:
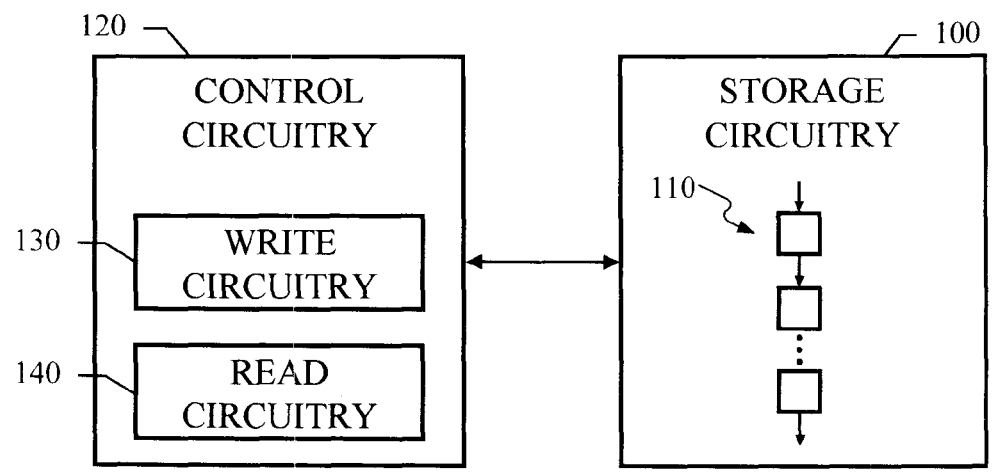
FIG. 1 is a block diagram illustrating a FIFO queue memory.

FIG. 1 is a block diagram illustrating a FIFO queue memory. Storage circuitry 100 includes data shifting circuitry 110 that shifts information in the storage circuitry with respect to a read operation. The storage circuitry 100 can be non-volatile memory and is responsive to control circuitry 120, which can include write circuitry 130 and read circuitry 140. The control circuitry 120 includes circuitry that conducts both first-in-first-out read operations and out-of-order read operations. For example, the read circuitry 140 can provide a normal priority queue read service, where read operations occur on a first-in-first-out basis, and a higher priority queue read service, where read operations occur out-of-order from the order of receipt of the information in the queue.

When a data entry is read from the FIFO queue memory, the rest of the data advances in the memory array in a shift register fashion. The read pointer is not incremented. If data is being read from entry i, all the data from entry i+1 and up to N are moved downward in the queue. It will be appreciated that terms such as "downward" and "bottom" as used herein do not require a particular memory design and only indicate an aspect of the FIFO queue memory with respect a reference direction in the queue. The bottom entry of a queue need not be the lowest addressable location in a memory array and may be the highest entry in the queue. Thus, the term "bottom entry" refers to the oldest read entry, the entry with the oldest data in-line for a read operation.

Figure 2:
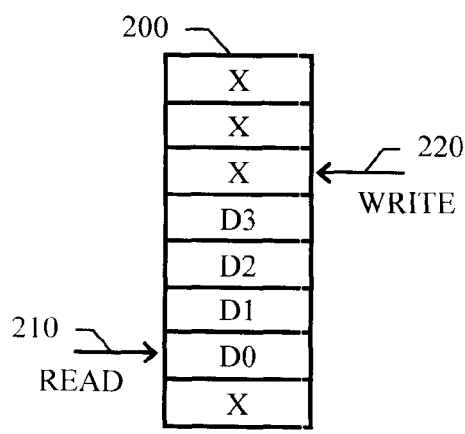
FIGS. 2-7 illustrate operations in a FIFO queue memory.
Figure 3:
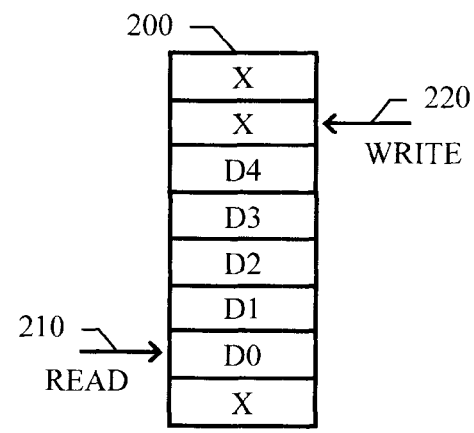

FIGS. 2-7 illustrate operations in a FIFO queue memory. FIG. 2 shows an initial state of a queue 200, with a read pointer 210 identifying the next entry to read, and a write pointer 220 identifying the next entry to write. After a write operation has occurred, FIG. 3 illustrates the new state of the queue 200, with the write pointer 220 incremented to the entry above the entry with the newly written data, D4.

Figure 4:
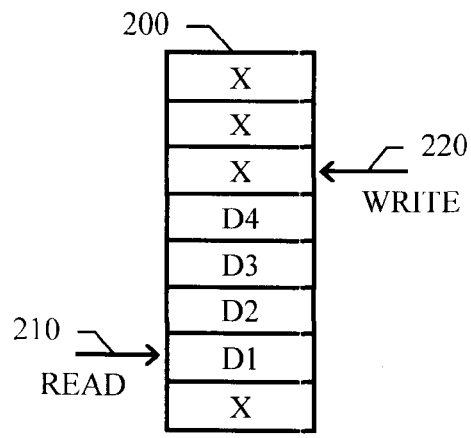

FIG. 4 illustrates the queue 200 after a read operation. The bottom entry previously containing D0, which has been read, and now contains the data D1, which has been shifted into the bottom entry automatically as part of the read operation. All of the data values D1-D4 have been shifted downward, and the write pointer 220 has been decremented upon the read operation.

Figure 5:
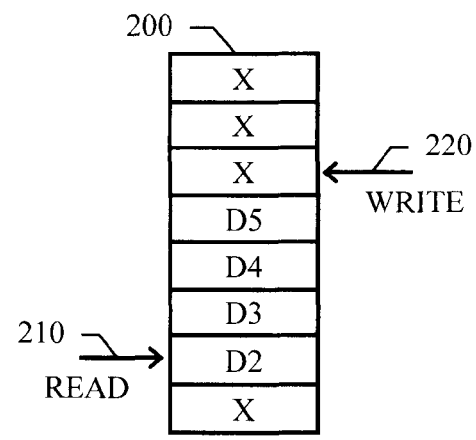

Thus, during normal read operations of the FIFO queue memory, the read pointer 210 remains pointing to the bottom entry of the queue 200, which may be address zero in a memory array. The write pointer 220 increments upon writes to the FIFO queue memory, decrements upon reads from the FIFO queue memory, and stays the same when a read and write operation occur together. FIG. 5 illustrates the queue 200 after a read of D1 and a write of D5. Thus, the normal FIFO read operations read from the same location, the "bottom" entry. This manner of FIFO queue memory operation can provide better timing behavior than traditional FIFO queues by relaxing the timing budget on the FIFO read data path (e.g., by omitting the multiplexer).

Figure 6:
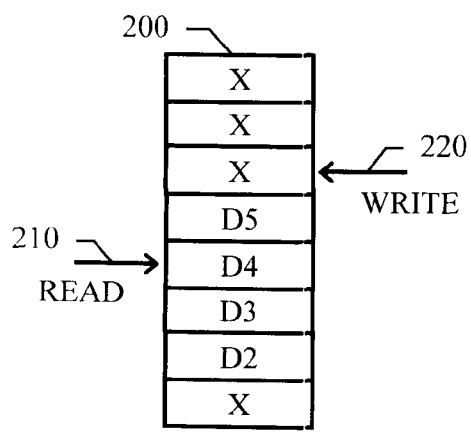
Figure 7:
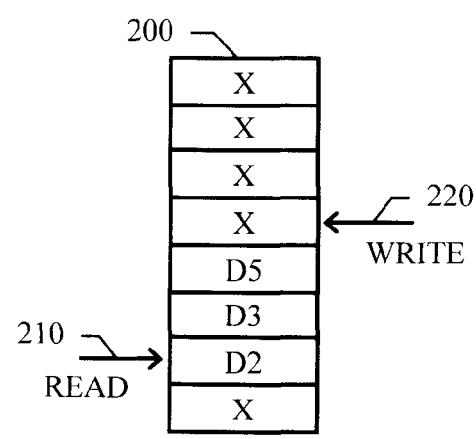

The FIFO queue memory can also support out-of-order data read under certain conditions. For example, data D4 may have some priority over other data values in the queue 200, and D4 can thus be read before older data values in the queue. This can be accomplished by setting the read pointer 210 to point to D4's entry, and then reading from that location in the queue 200. FIG. 6 illustrates the setting of the read pointer 210, and FIG. 7 illustrates the FIFO queue memory after D4 has been read.

The read pointer 210 can automatically revert to pointing to the bottom entry of the queue 200 after one or more out-of-order read operations. No extra logic is needed to store the last location of the read pointer 210, as the bottom entry of the queue 200 can be designed to revert to the bottom entry (e.g., the read pointer 210 resets to zero for the FIFO read operation). The read pointer 210 can revert to pointing to the bottom entry after each out-of-order read operation, or the read pointer 210 can revert to pointing to the bottom entry after a series of out-of-order read operations. For example, the read pointer 210 can be moved to a series of new locations in the queue 200 to serve multiple high priority transactions before returning to FIFO operation, where the read pointer 210 points to the bottom entry. Alternatively, the read pointer 210 need never point to the bottom entry, and read operations can be governed by a signal that indicates whether the bottom entry or the entry identified by the read pointer 210 is to be read next. These operations can be implemented and managed in the control circuitry 120.

Figure 8:
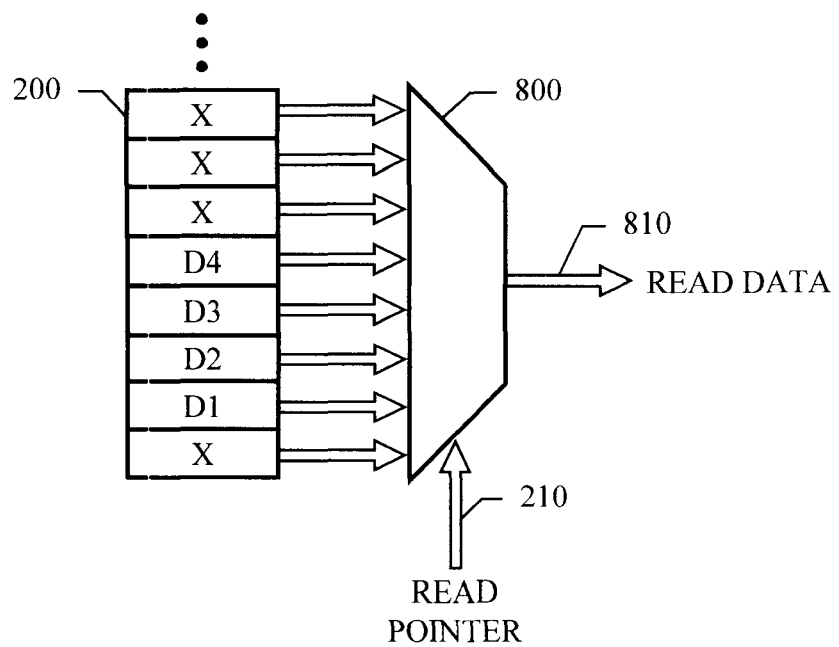
FIG. 8 is a block diagram illustrating a FIFO queue memory including a multiplexer.

FIG. 8 is a block diagram illustrating a FIFO queue memory including a multiplexer 800. The multiplexer 800 is operative to select entries of the queue 200 responsive to the read pointer 210 and outputs read data 810. The multiplexer 800 and read pointer 210 can be designed to address the full depth of the queue 200, allowing any entry in the queue to be processed out of order. Alternatively, the multiplexer 800 and read pointer 210 can be designed to address only a subset of all entries in the queue 200. This can reduce timing delay in the circuitry and can improve operational behavior. For example, this can force data entries over a certain age in the queue to be handled first, regardless of any higher priority entries that may be present in the queue outside of the addressable range of the read pointer 210.

Figure 9:
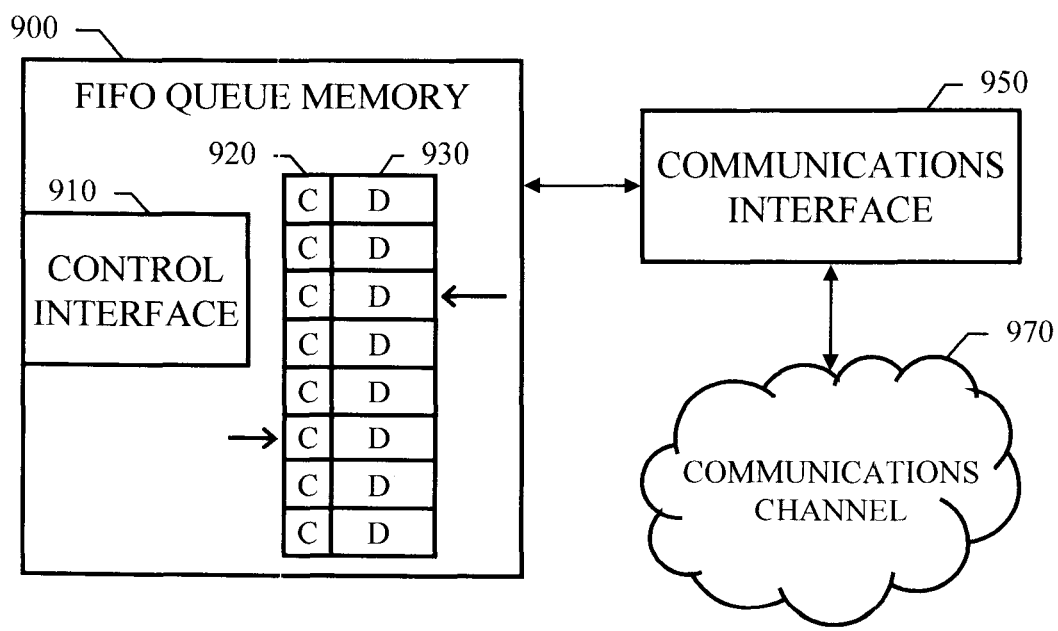
FIG. 9 is a block diagram illustrating an example system employing a FIFO queue memory.

FIG. 9 is a block diagram illustrating an example system employing a FIFO queue memory 900. The system includes a communications interface 950 that is responsive to a communications channel 970. The communications channel 970 can be a network, and the communications interface 950 can be a network interface device in a data processing system. The communications channel 970 can be a system bus in a data processing system, and the communications interface 950 can be a bus interface.

The FIFO queue memory 900 receives and stores information from the communications interface 950 and supports first-in-first-out read and out-of-order read operations with information shifting within the memory relative to a read operation. The FIFO queue memory 900 can includes a control interface 910 operable to program the read pointer. The control interface 910 can provide additional input and output signals, such as read, write and reset input signals, and empty and full output signals.

Specifying the read pointer through the control interface 910 can be done in a number of ways. The read pointer can be fully specified by supplying a full read address for the memory 900. The read pointer can be specified using an operational mode control signal that indicates when the FIFO queue memory 900 is to switch from FIFO operation to out-of-order operation, where the read pointer is then specified based on information in the FIFO queue memory 900. For example, the memory queue can contain both control bits 920 and data bits 930, where the control bits 920 indicate a priority level for the corresponding data bits 930. The read pointer can thus be specified based on the control bits 920, and this can be done either with or without an operational mode control signal (e.g., the read pointer can be specified entirely based on the control bits 920).

A few embodiments have been described in detail above, and various modifications are possible. Thus, other embodiments may be within the scope of the following claims.

What is claimed is:

1. A method for managing a queue memory comprising:
   retrieving stored data from an oldest read entry in a FIFO queue memory having entries formed in hardware upon a first read operation;
   retrieving stored data from a selected entry in the FIFO queue memory upon a second read operation; and
   shifting data stored in entries of the FIFO queue memory with respect to the oldest read entry upon the first read operation and with respect to the specified entry upon the second read operation.

2. The method of claim 1, wherein retrieving data from the selected entry comprises retrieving data based on a read pointer that is specified for the second read operation.

3. The method of claim 2, wherein the read pointer reverts to pointing to the oldest read entry for the first read operation, and retrieving data from the oldest read entry comprises retrieving data based on the read pointer.

4. The method of claim 2, wherein the read pointer is specified for the second read operation through a control interface of the FIFO queue memory.

5. The method of claim 2, wherein the first read operation comprises a normal read operation, the second read operation comprises a priority read operation, and the read pointer is specified for the priority read operation based on information in the FIFO queue memory.

6. A queue memory comprising:
   storage circuitry operative to store received data and responsive to control circuitry, the storage circuitry defining entries of a memory device and including data shifting circuitry that is configured to selectively shift data stored in the entries with respect to a read operation; and
   the control circuitry including read circuitry that conducts a first-in-first-out read operation during normal priority queue read service and that conducts an out-of-order read operation during higher priority queue read service.

7. The queue memory of claim 6, wherein the control circuitry comprises a multiplexer operative to select entries of the storage circuitry responsive to the read circuitry.

8. The queue memory of claim 7, wherein the multiplexer is operative to select entries from a subset of all entries in the storage circuitry.

9. The queue memory of claim 6, wherein the control circuitry includes a control interface operable to specify storage entries to read during the higher priority queue read service.

10. The queue memory of claim 6, wherein storage entries to read during the higher priority queue read service are specified based on information obtained from the storage circuitry.

11. The queue memory of claim 6, wherein the storage circuitry comprises non-volatile storage circuitry.

12. The queue memory of claim 6, wherein the memory device is configured as a FIFO.

13. A system comprising:
   a communications interface responsive to a communications channel; and
   a queue memory comprising a hardware device having memory entries to receive and store data from the communications interface, wherein the queue memory supports first-in-first-out read operations and out-of-order read operations with data shifting among the entries of the memory relative to a read operation.

14. The system of claim 13, wherein the communications channel comprises a system bus in a data processing system.

* * * * *